(12) United States Patent
Yu et al.

(10) Patent No.: US 11,924,485 B2
(45) Date of Patent: Mar. 5, 2024

(54) METHOD AND SYSTEM OF DISPLAYING A VIDEO

(71) Applicant: Shanghai Hode Information Technology Co., Ltd., Shanghai (CN)

(72) Inventors: Lulu Yu, Shanghai (CN); Guoyao Sun, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/952,373

(22) Filed: Nov. 19, 2020

(65) Prior Publication Data
US 2021/0160553 A1 May 27, 2021

(30) Foreign Application Priority Data
Nov. 27, 2019 (CN) .......................... 201911185214.X

(51) Int. Cl.
*H04N 21/2387* (2011.01)
*H04N 21/238* (2011.01)
*H04N 21/422* (2011.01)
*H04N 21/431* (2011.01)

(52) U.S. Cl.
CPC ... *H04N 21/2387* (2013.01); *H04N 21/23805* (2013.01); *H04N 21/42204* (2013.01); *H04N 21/4316* (2013.01)

(58) Field of Classification Search
CPC ........... H04N 21/4788; H04N 21/4316; H04N 21/4722; H04N 21/8133; H04N 21/4882; H04N 21/482; H04N 21/4622
See application file for complete search history.

(56) References Cited

U.S. PATENT DOCUMENTS

| | | | |
|---|---|---|---|
| 7,206,497 B1 * | 4/2007 | Boyle | H04N 21/43622 386/291 |
| 9,369,768 B1 * | 6/2016 | Mandel | H04N 21/435 |
| 2007/0245243 A1 * | 10/2007 | Lanza | H04N 21/4788 715/723 |

(Continued)

FOREIGN PATENT DOCUMENTS

| | | |
|---|---|---|
| CN | 105847995 A | 8/2016 |
| CN | 105916043 A | 8/2016 |

(Continued)

*Primary Examiner* — Jason Salce
(74) *Attorney, Agent, or Firm* — BakerHostetler

(57) ABSTRACT

The present invention discloses techniques of displaying a video. The disclosed techniques comprises receiving comment text information from a user, the comment text information is associated with the video; determining that the comment text information corresponds to a predetermined type of bullet screen based on parsing the comment text information; displaying a target bullet screen being generated based on the comment text information; displaying at least one interface element each of which is selectable and corresponds to an operation associated with the target bullet screen in response to detecting a selection of the target bullet screen on a first interface for playback of the video; and controlling the video to jump to a target interface for playback of the video in response to detecting a selection of one of the at least one interface element.

17 Claims, 5 Drawing Sheets

(56) References Cited

U.S. PATENT DOCUMENTS

| | | | | |
|---|---|---|---|---|
| 2008/0141310 A1* | 6/2008 | Kunkel | ............... | H04N 21/4135 |
| | | | | 725/58 |
| 2010/0046918 A1* | 2/2010 | Takao | ................ | H04N 21/4325 |
| | | | | 386/241 |
| 2011/0145880 A1* | 6/2011 | Wang | ................. | H04N 21/4722 |
| | | | | 725/117 |
| 2016/0277328 A1* | 9/2016 | Ishizuka | ............. | H04N 21/8547 |
| 2019/0200078 A1* | 6/2019 | Bhattacharya | ......... | G11B 27/34 |
| 2020/0336805 A1* | 10/2020 | Yoon | ................... | H04N 21/4316 |
| 2021/0227286 A1* | 7/2021 | Kusano | .............. | H04N 21/4788 |

FOREIGN PATENT DOCUMENTS

| | | |
|---|---|---|
| CN | 108024139 A | 5/2018 |
| CN | 109672920 A | 4/2019 |
| CN | 109996124 A | 7/2019 |
| CN | 110087117 A | 8/2019 |
| WO | WO 2017/166509 A1 | 10/2017 |

* cited by examiner

METHOD AND SYSTEM OF DISPLAYING A VIDEO

CROSS-REFERENCE TO RELATED APPLICATION

The present invention claims priority of Chinese patent application No. 201911185214.X, filed on Nov. 27, 2019. The entire disclosure of the above-identified application is hereby incorporated by reference herein and made a part of this specification.

BACKGROUND

With the rapid development of Internet technology, people have higher and higher requirements for video viewing experience. When users are not interested in the current content of a video, or need to fast forward the video to find the content they are interested in, they usually watch at multiple speeds or drag a video progress bar several times to skip the uninterested video content until they get to a target video they are interested in. However, the way of watching videos at multiple speeds easily causes users to miss highlights; the way of dragging the video progress bar many times requires users to adjust constantly, the operation is cumbersome, and the user's viewing experience is poor.

SUMMARY

The purpose of the present invention is to provide a method and a system of displaying a video, a computing device and a readable storage medium, which are used to solve the defect that the video cannot be quickly jumped to a specified time point in the prior art.

According to one aspect of the present invention, a method of displaying a video is provided, comprising the following steps:
  obtaining comment text information input by a user;
  determining whether a comment corresponding to the comment text information is a preset comment type according to the comment text information;
  generating a target bullet screen corresponding to the comment according to the comment text information when the comment is the preset comment type;
  when a video is on a video playback interface, if an operation of triggering the target bullet screen is detected, controlling the video to jump to a target video interface corresponding to the target bullet screen.

Optionally, the determining whether a comment corresponding to the comment text information is a preset comment type according to the comment text information, comprises:
  recognizing a text format of the comment text information;
  determining the comment is the preset comment type when the comment text information is recognized including at least one time in a preset format.

Optionally, the generating a target bullet screen corresponding to the comment according to the comment text information, comprises:
  when the comment text information includes a plurality of time in a preset format, identifying a first time according to an order of the plurality of the time in the preset format appearing in the comment text information;
  generating the target bullet screen according to the first time.

Optionally, after the generating a target bullet screen corresponding to the comment according to the comment text information, further comprising:
  setting display time of the target bullet screen on the video and a display time length of the target bullet screen;
  determining a display time range of the target bullet screen on the video according to the display time of the target bullet screen on the video and the display time length of the target bullet screen;
  determining a number of the target bullet screens displayed at the same time according to the display time range of the target bullet screen on the video;
  when the number of the target bullet screens displayed at the same time exceeds a preset value, displaying the preset number of the target bullet screens according to the display time of the target bullet screen on the video.

Optionally, when a video is on a video playback interface, if an operation of triggering the target bullet screen is detected, controlling the video jump to a target video interface corresponding to the target bullet screen, comprises:
  displaying an operation interface, wherein the operation interface includes a preset identifier, and the preset identifier is preset with a behavior event of jumping to the target video interface;
  controlling the video to jump to the target video interface when an operation of triggering the preset identifier is detected.

Optionally, the method further comprising:
  when the video is on the video playback interface, if the operation of triggering the target bullet screen is detected, displaying a retreat mark on the target video interface, and counting a duration of displaying the retreat mark;
  determining whether the operation of triggering the retreat mark is detected within a preset time according to the duration of displaying the retreat mark;
  controlling the video to return to the video playback interface when the operation of triggering the retreat mark is detected within the preset time.

Optionally, the method further comprising:
  cancelling a display of the retreat mark when the operation of triggering the retreat mark is not detected beyond the preset time.

In order to achieve the above purpose, the present invention also provides a system of displaying a video, the system specifically comprising the following components:
  an obtaining module, obtaining comment text information input by a user;
  a determining module, determining whether a comment corresponding to the comment text information is a preset comment type according to the comment text information;
  a generating module, generating a target bullet screen corresponding to the comment according to the comment text information when the comment is the preset comment type;
  a controlling module, when a video is on a video playback interface, if an operation of triggering the target bullet screen is detected, controlling the video to jump to a target video interface corresponding to the target bullet screen.

In order to achieve the above purpose, the present invention also provides a computing device, which comprises a memory, a processor, and computer programs that stored in the memory and operable on the processor, wherein the processor executes the computer programs for implementing steps of the method of displaying a video described above.

In order to achieve the above purpose, the present invention also provides a computer-readable storage medium, which stores computer programs upon, when the computer programs are executed by the processor, steps of the method of displaying a video described above are realized.

The method and system of displaying a video, computing device, and readable storage medium provided in the present invention recognize text information of the comment input by the user, recognize the type of the comment, when the type of the comment is a preset comment type, a corresponding target bullet screen is generated, when the video is displayed, if an operation of triggering the target screen is detected, jump to a corresponding target video interface. Through the embodiments of the present invention, the video can be quickly jumped to a specified time point position according to user requirement, which greatly improves the user's video viewing experience.

BRIEF DESCRIPTION OF THE DRAWINGS

Various other advantages and benefits will become apparent to those of ordinary skill in the art upon reading the detailed description of the preferred embodiments below. The drawings are only for the purpose of illustrating preferred embodiments and are not to be considered as a limitation of the present invention. Moreover, the same reference numerals are used to refer to the same parts throughout the drawings. In the drawings.

DETAILED DESCRIPTION OF ILLUSTRATIVE EMBODIMENTS

To make the objectives, technical solutions and advantages of the present application more comprehensible, the present application is described in further detail below with reference to embodiments and the accompanying drawings. It should be understood that the specific embodiments described herein are merely used for explaining the present application, and are not intended to limit the present application. All other embodiments obtained by those skilled in the art based on the embodiments of the present application without creative efforts shall fall within the protection scope of the present application.

Users may comment and/or share comments associated with a video or other content, which transforms the viewing experience by displaying comments reflecting thoughts and feelings of users viewing the same video, fosters a highly interactive and enjoyable viewing experience, and allows a user to benefit from the strong emotional bonds with other users who share similar aspiration and interests. The comments on any content (e.g., a video) may be animated when displayed. For example, the comments may be shown scrolling (e.g., from right to left, left to right, top to bottom, bottom to top) across the content, which may be referred to as "bullet screens."

A bullet screen refers to a comment floating across the screen in an effect of looking like a barrage in a flying shooting game, hence named as bullet screen. During watching a video or a live broadcast, a user can increase interaction between users or between users and network anchors by a way of sharing bullet screens. Bullet screens are displayed relative to frames of a video in a scrolling manner. The method of displaying a video as well as bullet screens provided by the present invention will be described below with reference to the accompanying drawings.

Figure 1:
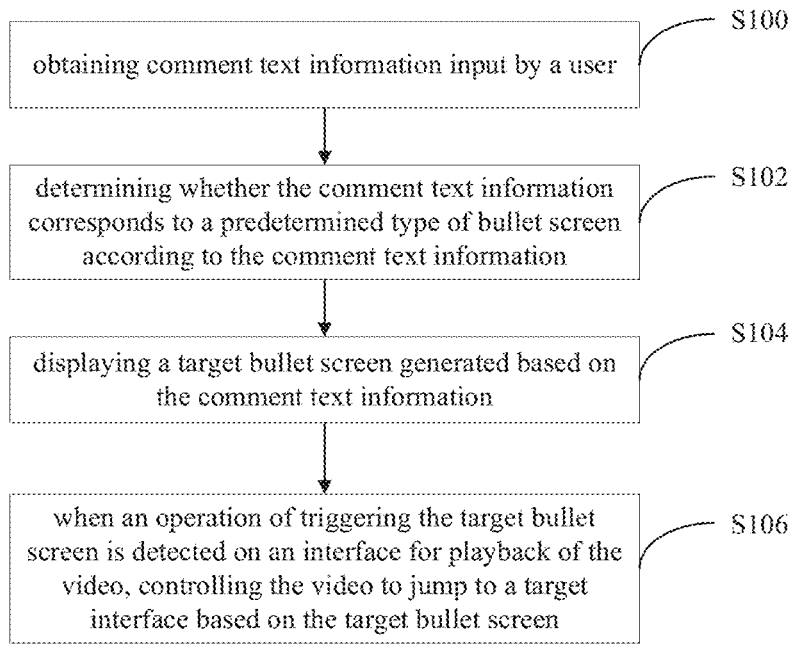
FIG. 1 is an optional flowchart of a method of displaying a video provided by an embodiment of the present disclosure.

FIG. 1 is an optional flowchart of a method of displaying a video of the present invention. It can be understood that the flowchart in the embodiment of the method is not used to limit the order of execution of the steps, and the following exemplarily describes a computing device as the execution subject. The computing device may include mobile terminals such as mobile phones, tablet computers, notebook computers, palmtop computers, personal digital assistants (Personal Digital Assistant, PDA), portable media players (Portable Media Player, PMP), navigation devices, wearable devices, smart hands pedometer, etc., and fixed terminals such as digital TVs and desktop computers.

As shown in FIG. 1, the method specific includes the following steps S100~S106.

Step S100: obtaining comment text information input by a user.

Specifically, when the user needs to send a comment, the comment can be sent by editing the comment text information, at this time, the computing device obtains the comment text information. For example, a game starts at 5:20; 40:30 the game ends 23:20. It should be noted that the comment refers to commentary subtitles that pop up when watching a video on the Internet.

Step S102: determining whether the comment text information correspond to a predetermined type of bullet screen based on parsing the comment text information.

Specifically, the comment text information input by the user is compared with a predetermined comment type (for example, an airborne comment type, the airborne comment type is described in the embodiment of the present invention) to determine whether the comment text information belongs to the predetermined information type. It should be noted that the airborne comment type refers to that a comment with the airborne comment type can not only pop up when watching the video, but also can be operated on the comment and the video can be controlled to achieve a function corresponding to the operation (for example: jump video). The comment with the airborne comment type has a different format from comments with other types, and the text format of the comment text information input by the user is compared with the text format of the airborne comment type to determine whether the comment type sent by the user is the airborne comment type.

Figure 2:
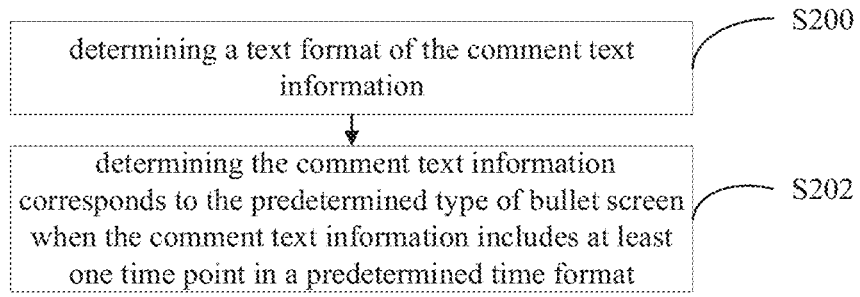
FIG. 2 is an optional specific flowchart of step S102 in FIG. 1.

In an exemplary embodiment, as shown in FIG. 2, the step S102 specifically includes steps S200~S202.

Step S200: determining a text format of the comment text information.

Step S202: determining the comment text information corresponds to the predetermined type of bullet screen when the comment text information is recognized including at least one time point in a predetermined time format.

Specifically, when the comment text information input by the user is obtained, the text format of the comment text information is recognized, wherein, the text format includes a time format and/or text contents. The text contents refer to text descriptions except time. When the comment text information includes the predetermined time format and the text contents, it is determined that the comment corresponding to the comment text information is the predetermined comment type.

Exemplarily, if the comment text information is "energy ahead!!", the computing device recognizes that the comment text information only includes text contents, that is, the comment text information does not include the time format, but the predetermined comment type includes the predetermined time format and text contents, therefore, the comment text information "high energy ahead!!" does not belong to the predetermined comment type. If the comment text information is "game start at 5:20", the computing device recognizes that the comment text information includes both the time format and text contents, and then it is determined that the comment text information "game start at 5:20" belongs to the predetermined comment type. In the same way, the comment text information "40:30 game ends 23:20" also belongs to the predetermined comment type. By identifying the text format of the comment text information, the comment type corresponding to the comment text information can be accurately determined.

Step S104: displaying a target bullet screen, wherein the target bullet screen is generated based on the comment text information when it is determined that the comment text information corresponds to the predetermined type of bullet screen.

Specifically, the computing device is predetermined with a format corresponding to the predetermined comment type, and when the comment type corresponding to the comment text information is determined, a corresponding target bullet screen is generated according to the format of the predetermined type of bullet screens. For example, the comment text information is "05:34 airborne command", and the format of the predetermined type of bullet screens is "text content+time", the target bullet screen generated corresponding to the comment text information "05:34 airborne command" is "airborne command 05:34". Of course, the format of the predetermined type of bullet screen can be freely set according to requirements, for example: "text content+time+identifier", "time+text content+identifier", "text content+time+text content+identifier", "text content+time+text content", "time+text content", "time+identifier", position of the text content, time point and identifier in the format of the predetermined type of bullet screens can be set freely, wherein, the identifier can be a pattern, picture or other symbols that can be used for identification.

Figure 7:
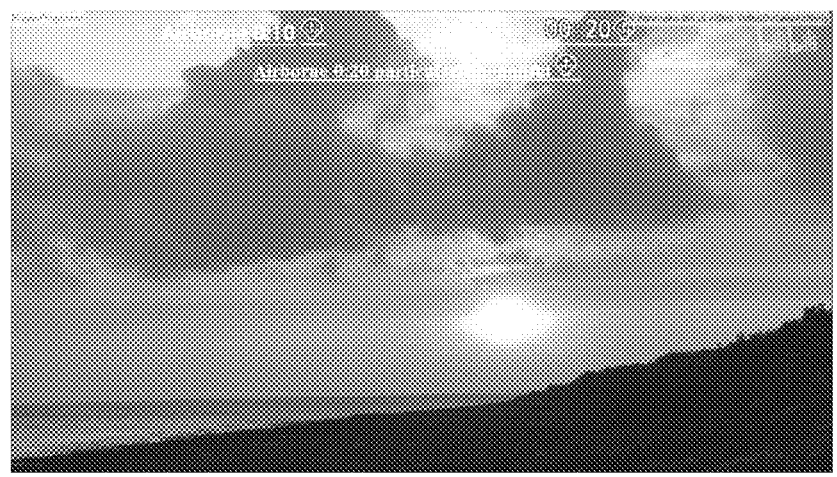
FIG. 7 is an optional schematic diagram of a display interface during a video playback provided by an embodiment of the present disclosure.
Figure 8:
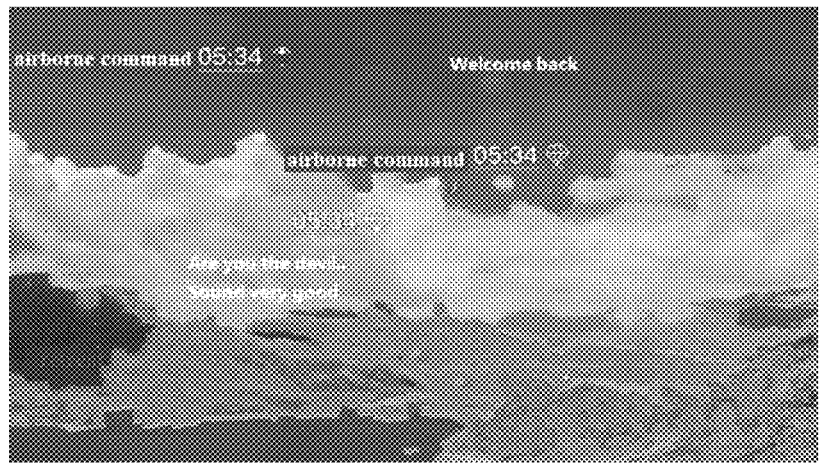
FIG. 8 is an optional schematic diagram of the display interface during the video playback provided by another embodiment of the present disclosure.
Figure 9:
FIG. 9 is an optional schematic diagram of the display interface during the video playback provided by another embodiment of the present disclosure.

FIGS. 7-8 are optional diagrams of video display interface comprising target bullet screens. FIG. 7 shows an optional video display interface before the user selects (e.g., clicks on) a target bullet screen. FIG. 8 shows the target interface (for playback of the video) of the video jumping to after the user clicks on the target bullet screen. The target interface as shown in FIG. 8 comprises a selectable element, e.g., a retreat icon by which a user can select to return to a first interface being displayed prior to the target interface. FIG. 9 shows a video display interface that has not yet jumped to the target interface after the user clicks on the target bullet screen. FIG. 9 comprises one or more interface elements each of which is selectable and corresponds to an operation associated with the target bullet screen.

FIG. 7 shows the target bullet screen "airborne 0:10 'parachute pattern'" in the format of "text content+time+identifier", the target bullet screen "00:20 'parachute pattern'" in the format of "time+identifier", and the target bullet screen "airborne 0:20 particularly beautiful 'parachute pattern'" in the format of "text content+time+identifier". Please refer to FIG. 8 and FIG. 9, if the format of the predetermined type of bullet screens is "text content+time+identifier" and the identifier is "parachute pattern", then the target bullet screen corresponding to the comment text information "05:34 airborne command" is generated and shown as "airborne command 05:34 parachute pattern".

It should be noted that in the embodiment, the comment corresponding to the comment text information refers to a comment that includes the comment text information without a clear format. The target bullet screen refers to a comment in the format of the predetermined type of bullet screen.

In an exemplary embodiment, after the target bullet screen corresponding to the comment is generated, the computing device renders the target bullet screen according to rendering instructions of the user, which includes at least: font size, color, height, position, transparency of the target bullet screen, display level in the video and/or size, color, and transparency of the indicator, so as to improve the viewing effect of the user. For example: the target bullet screen is rendered to be placed over a normal comment and can block the normal comment; the target bullet screen is rendered as a rolling comment or a top comment or a bottom comment; when the font of the target bullet screen is enlarged, the indicator is also enlarged, and the indicator is kept at the same line height as the target bullet screen; when the font color of the target bullet screen is rendered, the color of the indicator remains consistent with the font color; when the transparency of the target bullet screen text content is rendered, the transparency of the indicator is simultaneously rendered.

Figure 3:
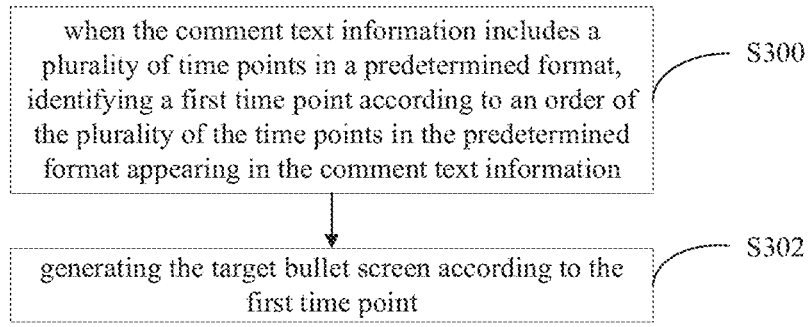
FIG. 3 is an optional specific flowchart of step S104 in FIG. 1.

In an exemplary embodiment, as shown in FIG. 3, the step S104 specifically includes steps S300~S302.

Step S300: when the comment text information includes a plurality of time points in a predetermined format, identifying a first time point according to an order of the plurality of the time in the predetermined format appearing in the comment text information.

Step S302: generating the target bullet screen according to the first time.

Specifically, when the comment text information input by the user includes the plurality of the time in the predetermined format, it is necessary to determine a time from the plurality of the time in the predetermined format, so as to generate a target bullet screen corresponding to the comment text information according to the determined time. Through the embodiment, it can effectively prevent the user from mis-input when editing the comment text information, and greatly improve the processing performance of the computing device.

It should be noted that when determining whether the comment text information includes the plurality of the time in the predetermined format, it is first necessary to determine whether the comment text information includes time, and when the comment text information includes time, it is necessary to further determine whether the comment text information includes the plurality of the time in the predetermined format. By determining the time in the predetermined format, whether the time in the comment text information meets requirements of the predetermined comment type is determined. For example: it is determined whether the time in the comment text information is within a total duration range of the video.

In an exemplary embodiment, the step of determine whether the comment text information includes time includes: identifying the text format of the comment text information, when the comment text information includes [number+colon+number] or when the text format of time is described in Chinese, it is determined that the comment text information includes the time format. It should be noted that the colon includes a colon in a Chinese format and a colon in an English format. For example: 2:30; 02:30; 183:23; 1:23:38; two minutes and thirty seconds.

In an exemplary embodiment, steps of determining whether the comment text information includes a time in a predetermined format includes: firstly, determining whether values of minutes and seconds in the time of the comment text information do not exceed 60; then, obtaining a total duration of the video when the values of the minutes and the seconds do not exceed 60; then, determining whether the time exceeds the total duration of the video; finally, determining that the time conforms to the predetermined format when the time does not exceed the total duration of the video, and the comment text information includes the time in the predetermined format. For example, the comment text information is "airborne command 183:23" and it is determined that the comment text information includes the time 183:23, but the 183:23 does not belong to the time in the predetermined format in the embodiment, then the comment text information "airborne command 183:23" does not include the time in the predetermined format.

Figure 4:
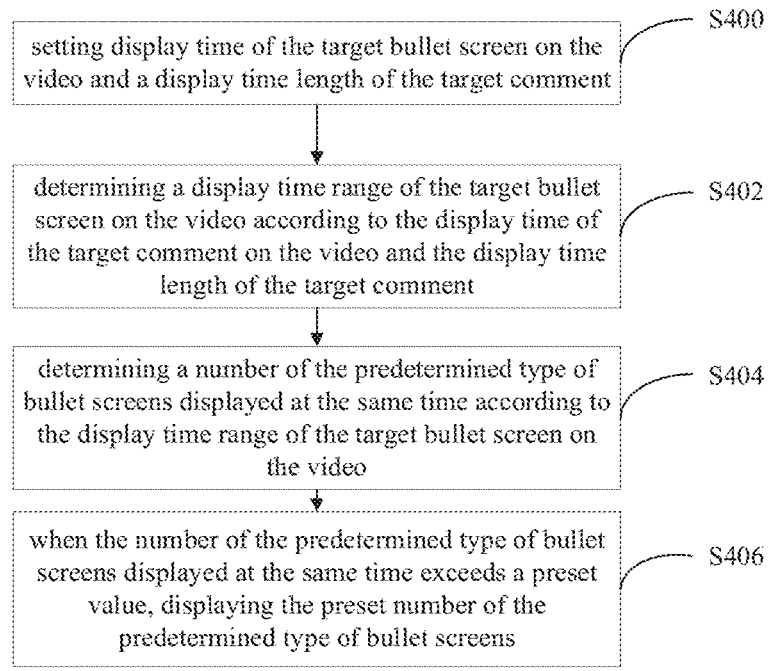
FIG. 4 is an optional specific flowchart of the method of displaying a video provided by another embodiment of the present disclosure.

In an exemplary embodiment, as shown in FIG. 4, the method further includes steps S400~S406.

Step S400: setting a starting time of displaying the target bullet screen on the video and a display time length of the target bullet screen.

Step S402: determining a display time range of the target bullet screen on the video according to the display time of the target bullet screen on the video and the display time length of the target bullet screen.

Step S404: determining a number of the predetermined type of bullet screens displayed at the same time based on the display time range of the target bullet screen.

Step S406: when the number of the predetermined type of bullet screens displayed at the same time exceeds a predetermined value, displaying the predetermined number of predetermined type of bullet screens according to the display time of the target bullet screen on the video.

Specifically, during the video playback, in order not to affect the viewing effect of the video, it is necessary to limit the number of comments displayed on each frame of the video. Start display time of each target bullet screen on the video and a display duration on the video can be set freely, and a time range of each target bullet screen displayed on the video is determined by the set start display time and the display duration. The time range of each target bullet screen displayed on the video is compared to determine the number of target bullet screens within an overlapping time range, and then to determine the number of comments displayed on each frame of the video. For example: if it is determined that a time range of a target bullet screen 1 displayed on a video A is [t1, t2], a time range of a target bullet screen 2 displayed on the video A is [t3, t4], a time range of a target bullet screen 3 displayed on the video A is [1t5, 16], and a time range of a target bullet screen 4 displayed on the video A is [t7, t8], wherein, t2−t1=t4−t3=t6−t5=t8−t7, t1<t3<t5<t7<t2<t4<t6<t8, it is determined that there are 4 target bullet screens within a time range of [17, t2], there are 3 target bullet screens within a time range of [15, t7], there are 2 target bullet screens within a time range of [t3, t5], and there is 1 target bullet screen within a time range of [t1, t3].

If the computing device is predetermined with the maximum number of the target bullet screens simultaneously displayed on the video is 3, since the display time of the target bullet screen 1, the target bullet screen 2 and the target bullet screen 3 displayed on the video A is earlier than the target bullet screen 4, the target bullet screen 4 is not displayed when the time t7 arrives. Of course, in another exemplary embodiment, when the time t2 arrives, since the target bullet screen 1 disappears, and since t7<t2<t8, the target bullet screen 4 can be displayed, thus it also ensures that the maximum number of the target bullet screens simultaneously displayed on the video is 3. Through the embodiment, the number of comments of the predetermined comment type on the same screen can be greatly controlled, and the user's viewing experience can be greatly improved.

Step S106, when a video is on a video playback interface, if an operation of triggering the target bullet screen is detected, controlling the video to jump to a target video interface corresponding to the target bullet screen. Wherein, the target bullet screen includes comment content and comment time.

Specifically, when the video is in a playing state or in a paused state, if the user clicks to trigger the target bullet screen, it may jump to the target video interface of the comment time position corresponding to the target bullet screen. Please refer to FIG. 8, the FIG. 8 shows the target video interface jumped after the user clicks on the target bullet screen.

Figure 5:
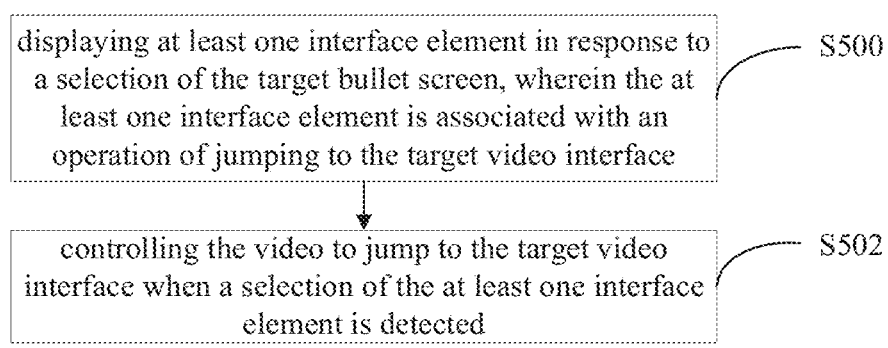
FIG. 5 is an optional specific flowchart of step S106 in FIG. 1.

In an exemplary embodiment, as shown in FIG. 5, the step S106 specifically includes steps S500~S502.

Step S500: displaying an operation interface, wherein the operation interface includes a predetermined identifier, and the predetermined identifier is predetermined with a behavior event of jumping to the target video interface.

Step S502: controlling the video to jump to the target video interface when an operation of triggering the predetermined identifier is detected.

Specifically, in another embodiment, when the video is in the playing state or in the paused state, if the user clicks to trigger the target bullet screen, a predetermined operation interface is displayed, and the operation interface includes at least one interface element (e.g., identifier), each identifier is predetermined with a corresponding behavior event, so that when the user triggers the identifier, the video is triggered to execute the corresponding behavior event. The behavior event includes at least, keeping the video interface still and liking the target bullet screen, reporting the target bullet screen, and/or jumping to the target video interface corresponding to a time point included in the target bullet screen. Of course, the operation interface may also include the comment content and the comment time, which are not limited in the embodiment of the present invention.

Please refer to FIG. 9, the FIG. 9 shows the video display interface after the user triggers the target bullet screen while the video is in the first interface for playback of the video. A lower left corner of the interface displays interface elements, e.g., "airborne command 05:34 "like icon", "red flag icon", "parachute icon"". The user can control the video to jump to the target video interface by clicking one of the icons. The present disclosure provides a secondary confirmation function to the user to avoid mis-operation from the user, thereby improve the user's video viewing experience. When the user selects the "like icon", the video remains still and the target bullet screen is liked. When the user clicks the "red flag icon", the target bullet screen is reported. When the user clicks the "parachute icon", the video is controlled to jump to the target interface of displaying the video based on the time point included in the target bullet screen.

It can be seen from the interface as shown in FIG. 9 that the target bullet screen includes comment text information "airborne command 05:34". When a user selects the target bullet screen, a plurality of selectable interface elements (e.g., "like icon", "red flag icon", "parachute icon") are displayed on the interface as shown in FIG. 9. When the user clicks the "parachute icon", the video will be controlled to jump to the target video interface corresponding to the time point "05:34" included in the target bullet screen.

Figure 6:
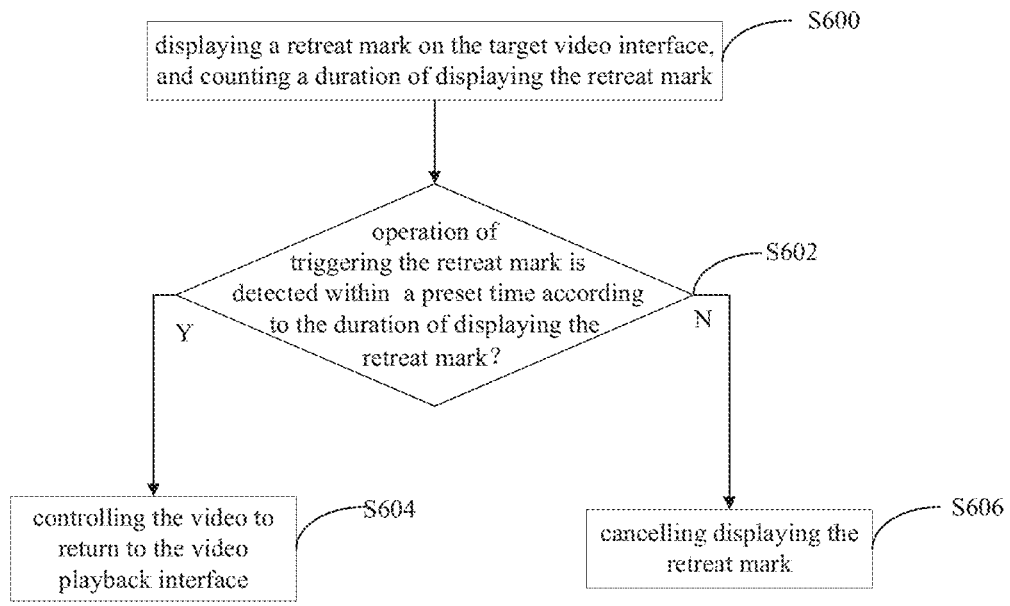
FIG. 6 is an optional specific flowchart of the method of displaying a video provided by another embodiment of the present disclosure.

In an exemplary embodiment, as shown in FIG. 6, the method may further include steps S600~S606.

Step S600: generating and displaying a selectable interface element, e.g., a retreat mark on the target video interface as shown in FIG. 8, and counting a duration of displaying the retreat mark.

Step S602: determining whether the operation of triggering the retreat mark is detected within a predetermined period of time according to the duration of displaying the retreat mark, when the operation of triggering the retreat mark is detected, step S604 is executed, otherwise, step S606 is executed.

Step S604: controlling the video to return back to the first interface for playback of the video.

Step S606: cancelling displaying the retreat mark.

Specifically, when the video has already jumped to the target video interface, the retreat mark is displayed, and whether the operation of triggering the retreat mark is received within the predetermined period of time is detected. When the triggering the retreat mark is received within the predetermined period of time, the video is controlled to return to the first interface for playback of the video. When the predetermined time is exceeded and the triggering the retreat mark is not detected, the retreat mark is cancelled. When the user is not interested or dissatisfied with the target video interface after the jump, the video playback interface is returned to before the jump by triggering the retreat mark. Please refer to FIG. 8, in FIG. 8, the "retreat" mark appears in the lower left corner of the target video interface for user operation.

It should be noted that the retreat mark may be a retreat button or a retreat pattern, and the retreat mark is predetermined with a retreat behavior event, when the retreat mark is triggered, the retreat behavior event is triggered to return to the video playback interface from the target video interface. By setting the retreat mark on the target video interface, more video viewing options are provided to users and the user's viewing experience is improved.

In an exemplary embodiment, the computing device also obtains a display status of each target bullet screen on the video, trigger operation information of each target bullet screen, and trigger operation information of the retreat mark.

Then, according to the display status of each target bullet screen on the video, total times of all target bullet screens displayed on the video playback interface are counted, according to the trigger operation information of each target bullet screen, total trigger times of all the target bullet screens are counted, according to the trigger operation information of the retreat mark, total times of triggering the retreat mark are counted. Then, according to the total times of all the target bullet screens displayed on the video playback interface, total trigger times of all the target bullet screens, and the total times of triggering the retreat mark, the user's use of the jump function of the predetermined comment type is counted, so as to evaluate the value of the jump function of the predetermined comment type.

Based on the method of displaying a video provided in the above embodiment, a system of displaying a video is provided in the embodiment, which can be applied to a computing device. Specifically, the figure shows an optional structural block diagram of the system of displaying a video, the system of displaying a video is divided into one or more program modules, and the one or more program modules are stored in a storage medium and executed by one or more processors to complete the present invention. The program modules referred in the present invention refers to a series of computer program instruction segments capable of accomplishing specific functions, and is more suitable for describing execution process of the system of displaying a video in the storage medium than the program itself, the following description will specifically describe the functions of the program modules of the embodiment.

Figure 10:
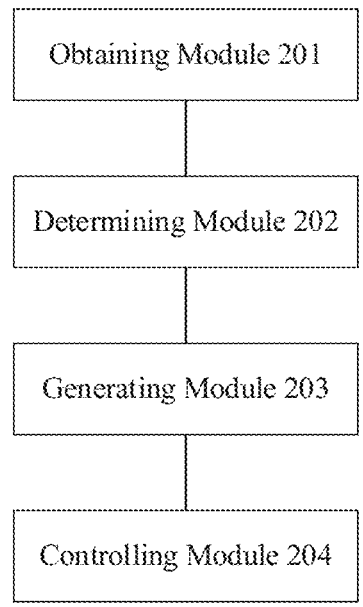
FIG. 10 is an optional schematic diagram of program modules of a system of displaying a video of an embodiment of the present disclosure.

As shown in FIG. 10, the system of displaying a video specifically includes the following components:

An obtaining module 201, obtaining comment text information input by a user.

Specifically, when the user needs to send a comment, the comment can be sent by editing the comment text information, at this time, the obtaining module 201 obtains the comment text information. For example, a game starts at 5:20; 40:30 the game ends at 23:20. It should be noted that the comment refers to commentary subtitles that pop up when watching a video on the Internet.

A determining module 202, determining whether a comment corresponding to the comment text information is a predetermined comment type according to the comment text information.

Specifically, the determining module 202 compares the comment text information input by the user with a predetermined comment type (for example, an airborne comment type, the airborne comment type is described in the embodiment of the present invention) to determine whether the comment text information belongs to the predetermined information type. It should be noted that the airborne comment type refers to that a comment with the airborne comment type can not only pop up when watching the video, but also can be operated on the comment and the video can be controlled to achieve a function corresponding to the operation (for example: jump video). The comment with the airborne comment type has a different format from comments with other types, and the text format of the comment text information input by the user is compared with the text format of the airborne comment type to determine whether the comment type sent by the user is the airborne comment type.

In an exemplary embodiment, the determining module 202 is specifically used for: recognizing a text format of the comment text information; determining the comment is the predetermined comment type when the comment text information is recognized including at least one time of a predetermined time format.

Specifically, when the obtaining module 201 obtains the comment text information input by the user, the text format of the comment text information is recognized, wherein, the text format includes a time format and/or text contents. The text contents refer to text descriptions except time. When the comment text information includes the predetermined time format and the text contents, the determining module 202 determines that the comment corresponding to the comment text information is the predetermined comment type.

Exemplarily, if the comment text information is "Energy ahead!!", the computing device recognizes that the comment text information only includes text contents, that is, the comment text information does not include the time format, but the predetermined comment type includes the predetermined time format and text contents, therefore, the comment text information "High energy ahead!!" does not belong to the predetermined comment type. If the comment text information is "game start at 5:20", the determining module 202 recognizes that the comment text information includes both the time format and text contents, and then it is determined that the comment text information "game start at 5:20" belongs to the predetermined comment type. In the same way, the comment text information "40:30 game ends 23:20" also belongs to the predetermined comment type. By identifying the text format of the comment text information, the comment type corresponding to the comment text information can be accurately determined.

A generating module 203, generating a target bullet screen corresponding to the comment according to the comment text information when the comment is the predetermined comment type.

Specifically, the computing device is predetermined with a format corresponding to the predetermined comment type, and when the comment type corresponding to the comment text information is determined, the generating module 203 generates a corresponding target bullet screen according to the format of the predetermined type of bullet screens. For example, the comment text information is "05:34 airborne command", and the format of the predetermined type of bullet screens is "text content+time", the target bullet screen generated corresponding to the comment text information "05:34 airborne command" is "airborne command 05:34". Of course, the format of the predetermined type of bullet screen can be freely set according to requirements, for example: "text content+time+identifier", "time+text content+identifier". "text content+time+text content+identifier", "text content+time+text content", "time+text content", "time+identifier", position of the text content, time and identifier in the format of the predetermined type of bullet screens can be set freely, wherein, the identifier can be a pattern, picture or other symbols that can be used for identification.

FIGS. 7-8 are optional diagrams of video display interface during a video playback. Wherein, FIG. 7 shows an optional video display interface before the user clicks on the target bullet screen, FIG. 8 shows the target video page jumped after the user clicks on the target bullet screen, FIG. 9 is a video display interface that has not yet jumped after the user clicks on the target bullet screen. FIG. 7 shows the target bullet screen "airborne 0:10 'parachute pattern'" in the format of "text content+time+identifier", the target bullet screen "00:20 'parachute pattern'" in the format of "time+ identifier", and the target bullet screen "airborne 0:20 particularly beautiful 'parachute pattern'" in the format of "text content+time+identifier". Please refer to FIG. 8 and FIG. 9, if the format of the predetermined comment type is "text content+time+identifier" and the identifier is "parachute pattern", then, target bullet screen effect corresponding to the comment text information "05:34 airborne command" is generated shown in the corresponding comment "airborne command 05:34 parachute pattern" in FIG. 8.

In an exemplary embodiment, after the target bullet screen corresponding to the comment is generated, the computing device renders the target bullet screen according to rendering instructions of the user, which includes at least: font size, color, height, position, transparency of the target bullet screen, display level in the video and/or size, color, and transparency of the indicator, so as to improve the viewing effect of the user. For example: the target bullet screen is rendered to be placed over a normal comment and can block the normal comment; the target bullet screen is rendered as a rolling comment or a top comment or a bottom comment; when the font of the target bullet screen is enlarged, the indicator is also enlarged, and the indicator is kept at the same line height as the target bullet screen; when the font color of the target bullet screen is rendered, the color of the indicator remains consistent with the font color; when the transparency of the target bullet screen text content is rendered, the transparency of the indicator is simultaneously rendered.

In an exemplary embodiment, the generating module 203 is also specifically used for: when the comment text information includes a plurality of time in a predetermined format, identifying a first time according to an order of the plurality of the time in the predetermined format appearing in the comment text information; generating the target bullet screen according to the first time.

Specifically, when the comment text information input by the user includes the plurality of the time in the predetermined format, it is necessary to determine a time from the plurality of the time in the predetermined format, so as to generate a target bullet screen corresponding to the comment text information according to the determined time. Through the embodiment, it can effectively prevent the user from mis-input when editing the comment text information, and greatly improve the processing performance of the computing device.

It should be noted that when determining whether the comment text information includes the plurality of the time in the predetermined format, it is first necessary to determine whether the comment text information includes time, and when the comment text information includes time, it is necessary to further determine whether the comment text information includes the plurality of the time in the predetermined format. By determining the time in the predetermined format, whether the time in the comment text information meets requirements of the predetermined comment type is determined. For example: it is determined whether the time in the comment text information is within a total duration range of the video.

In an exemplary embodiment, the determining module 202 is also specifically used for: identifying the text format of the comment text information, when the comment text information includes [number+colon+number] or when the text format of time is described in Chinese, it is determined that the comment text information includes the time format. It should be noted that the colon includes a colon in a Chinese format and a colon in an English format. For example: 2:30; 02:30; 183:23; 1:23:38; two minutes and thirty seconds.

In an exemplary embodiment, the determining module 202 is also specifically used for: firstly, determining whether values of minutes and seconds in the time of the comment text information do not exceed 60; then, obtaining a total duration of the video when the values of the minutes and the seconds do not exceed 60; then, determining whether the time exceeds the total duration of the video; finally, determining that the time conforms to the predetermined format when the time does not exceed the total duration of the video, and the comment text information includes the time in the predetermined format. For example, the comment text information is "airborne command 183:23" and it is determined that the comment text information includes the time 183:23, but the 183:23 does not belong to the time in the predetermined format in the embodiment, then the comment text information "airborne command 183:23" does not include the time in the predetermined format.

In an exemplary embodiment, the computing device also includes a setting unit, a determining unit and a display unit.

The setting unit: setting display time of the target bullet screen on the video and a display time length of the target bullet screen.

The determining unit: determining a display time range of the target bullet screen on the video according to the display time of the target bullet screen on the video and the display time length of the target bullet screen; determining a number of the target bullet screens displayed at the same time according to the display time range of the target bullet screen on the video.

The display unit: when the number of the target bullet screens displayed at the same time exceeds a predetermined value, displaying the predetermined number of the target bullet screens according to the display time of the target bullet screen on the video.

Specifically, during the video playback, in order not to affect the viewing effect of the video, it is necessary to limit the number of comments displayed on each frame of the video. Start display time of each target bullet screen on the video and a display duration on the video can be set freely, and a time range of each target bullet screen displayed on the video is determined by the set start display time and the display duration. The time range of each target bullet screen displayed on the video is compared to determine the number of target bullet screens within an overlapping time range, and then to determine the number of comments displayed on each frame of the video. For example: if it is determined that a time range of a target bullet screen 1 displayed on a video A is [t1, t2], a time range of a target bullet screen 2 displayed on the video A is [t3, t4], a time range of a target bullet screen 3 displayed on the video A is [1t5, t6], and a time range of a target bullet screen 4 displayed on the video A is [t7, t8], wherein, t2−t1=t4−t3=t6−t5=t8−t7, t1<t3<t5<t7<t2<t4<t6<t8, it is determined that there are 4 target bullet screens within a time range of t7, t21, there are 3 target bullet screens within a time range of [t5, t7], there are 2 target bullet screens within a time range of [t3, t5], and there is 1 target bullet screen within a time range of [t1, t3].

If the computing device is predetermined with the maximum number of the target bullet screens simultaneously displayed on the video is 3, since the display time of the target bullet screen 1, the target bullet screen 2 and the target bullet screen 3 displayed on the video A is earlier than the target bullet screen 4, the target bullet screen 4 is not displayed when the time t7 arrives. Of course, in another exemplary embodiment, when the time t2 arrives, since the target bullet screen 1 disappears, and since t7<t2<t8, the target bullet screen 4 can be displayed, thus it also ensures that the maximum number of the target bullet screens simultaneously displayed on the video is 3. Through the embodiment, the number of comments of the predetermined comment type on the same screen can be greatly controlled, and the user's viewing experience can be greatly improved.

A controlling module 204, when a video is on a video playback interface, if an operation of triggering the target bullet screen is detected, controlling the video to jump to a target video interface corresponding to the target bullet screen. Wherein, the target bullet screen includes: comment content and comment time.

Specifically, when the video is in a playing state or in a paused state, if the user clicks to trigger the target bullet screen, the controlling module 204 controls the video to jump to the target video interface of the comment time position corresponding to the target bullet screen. Please refer to FIG. 8, the FIG. 8 shows the target video interface jumped after the user clicks on the target bullet screen.

In an exemplary embodiment, the controlling module 204, is further used for: displaying an operation interface, wherein the operation interface includes a predetermined identifier, and the predetermined identifier is predetermined with a behavior event of jumping to the target video interface; controlling the video to jump to the target video interface when an operation of triggering the predetermined identifier is detected.

Specifically, in another embodiment, when the video is in the playing state or in the paused state, if the user clicks to trigger the target bullet screen, a predetermined operation interface is displayed, and the operation interface includes at least one type of identifier, each identifier is predetermined with a corresponding behavior event, so that when the user triggers the identifier, the video is triggered to execute the corresponding behavior event. The behavior event includes at least: keeping the video interface still and liking the target bullet screen, reporting the target bullet screen, and/or jumping to the target video interface of a time point corresponding to the target bullet screen. Of course, the operation interface may also include the comment content and the comment time, which are not limited in the embodiment of the present invention.

Please refer to FIG. 9, the FIG. 9 shows the video display interface after the user triggers the target bullet screen while the video is in the playback interface. A lower left corner of the video display interface displays the operation interface of "airborne command 05:34 "like icon", "red flag icon", "parachute icon"". The user can control the video to jump to the target video interface corresponding to the icon by clicking on different icons, so as to a secondary confirmation function is provided to the user to avoid mis-operation from the user, thereby improve the user's video viewing experience. When the user clicks the "like icon", no operation is performed, the video remains still and the target video interface is liked. When the user clicks the "red flag icon", the target bullet screen is reported. When the user clicks the "parachute icon", the video is controlled to jump to the target video of the time point corresponding to the target bullet screen. It can be seen from the operation interface in FIG. 9 that the target bullet screen whose comment text information including "airborne command 05:34" is clicked by the user, when the user clicks the "parachute icon", the video will be controlled to jump to the target video interface of 05:34.

In an exemplary embodiment, the computing device further includes a retreat unit, the retreat unit is used for: when the video is on the video playback interface, if the operation of triggering the target bullet screen is detected, displaying a retreat mark on the target video interface, and counting a duration of displaying the retreat mark; determining whether the operation of triggering the retreat mark is detected within a predetermined time according to the duration of displaying the retreat mark, controlling the video to return to the video playback interface when the operation of triggering the retreat mark is detected; cancelling displaying the retreat mark when the operation of triggering the retreat mark is not detected beyond the predetermined time.

Specifically, when the video has already jumped to the target video interface, the retreat mark is displayed, and whether the operation of triggering the retreat mark is received within the predetermined time is detected. When the operation of triggering the retreat mark is received within the predetermined time, the video is controlled to return to the video playback interface. When the predetermined time is exceeded and the operation of triggering the retreat mark is not received, the retreat mark is cancelled. When the user is not interested or dissatisfied with the target video interface after the jump, the video playback interface is returned to before the jump by triggering the retreat mark. Please refer to FIG. 8, in FIG. 8, the "retreat" mark appears in the lower left corner of the target video interface for user operation.

It should be noted that the retreat mark may be a retreat button or a retreat pattern, and the retreat mark is predetermined with a retreat behavior event, when the retreat mark is triggered, the retreat behavior event is triggered to return to the video playback interface from the target video interface. By setting the retreat mark on the target video interface, more video viewing options are provided to users and the user's viewing experience is improved.

In an exemplary embodiment, the computing device also obtains a display status of each target bullet screen on the video, trigger operation information of each target bullet screen, and trigger operation information of the retreat mark. Then, according to the display status of each target bullet screen on the video, total times of all target bullet screens displayed on the video playback interface are counted, according to the trigger operation information of each target bullet screen, total trigger times of all the target bullet screens are counted, according to the trigger operation information of the retreat mark, total times of triggering the retreat mark are counted. Then, according to the total times of all the target bullet screens displayed on the video playback interface, total trigger times of all the target bullet screens, and the total times of triggering the retreat mark, the user's use of the jump function of the predetermined comment type is counted, so as to evaluate the value of the jump function of the predetermined comment type.

Figure 11:
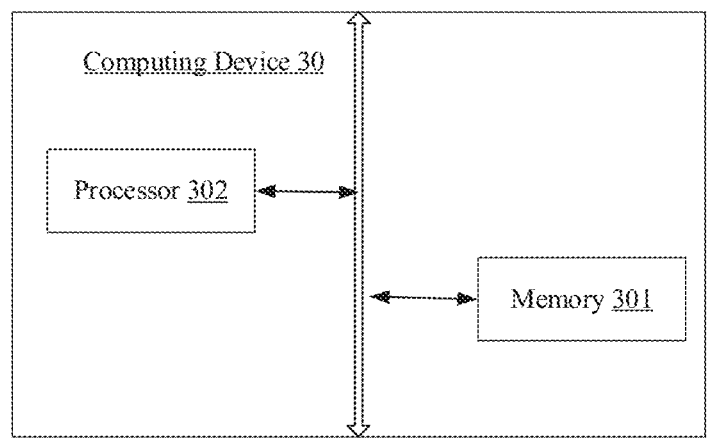
FIG. 11 is an optional schematic diagram of a hardware structure of the computing device of an embodiment of the present disclosure.

The embodiment also provides a computing device, such as a smart phone, a tablet computer, a notebook computer, a desktop computer, a rack server, a blade server, a tower server or a cabinet server (including independent server or server cluster composed of a plurality of servers) that can execute programs. As shown in FIG. 11, the computing device 30 includes, but is not limited to, a memory 301 and a processor 302 that can communicate with each other through a system bus. It should be pointed out that FIG. 11 only shows the computing device 30 with components 301-302, but it should be understood that it is not required to implement all the illustrated components, and more or fewer components may be implemented instead.

In the embodiment, the memory 301 (that is a readable storage medium) includes a flash memory, a hard disk, a multimedia card, a card type memory (e.g., SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc. In some embodiments, the memory 301 may be an internal storage module of the computing device 30 such as the hard disk or the memory of the computing device 30. In other embodiments, the memory 301 may also be an external storage device of the computing device 30, such as a plugged hard disk, a smart media card (SMC), secure digital (SD) card, a flash memory card, and the like provided on the computing device 30. Of course, the memory 301 may also include both an internal storage module and an external storage device of the computing device 30. In the embodiment, the memory 301 is generally used to store an operating system and various types of application software installed in the computing device 30, for example, program codes of the system of displaying a video of the above embodiment. In addition, the memory 301 may also be used to temporarily store various types of data that have been or will be outputted.

The processor 302, in some embodiments, may be a central processing unit (CPU), a controller, a microcontroller, a microprocessor, or other data processing chip. The processor 302 is generally used to control the overall operation of the computing device 30.

Specifically, in the embodiment, the processor 302 is used to run the programs of the method of displaying a video stored in the memory 301, and when the programs of the method of displaying a video is executed, the following steps are implemented:

obtaining comment text information input by a user, determining whether a comment corresponding to the comment text information is a predetermined comment type according to the comment text information;

generating a target bullet screen corresponding to the comment according to the comment text information when the comment is the predetermined comment type;

when a video is on a video playback interface, if an operation of triggering the target bullet screen is detected, controlling the video to jump to a target video interface corresponding to the target bullet screen.

The specific implementation process of the above steps of the method can refer to the above-mentioned embodiments, and the embodiment will not be repeated here.

The embodiment also provides a computer-readable storage medium, such as a flash memory, a hard disk, a multimedia card, a card type memory (e.g., SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, a server, an App store etc., which stores computer programs upon, and when the computer programs are executed by a processor, the following method steps are implemented:

obtaining comment text information input by a user;

determining whether a comment corresponding to the comment text information is a predetermined comment type according to the comment text information;

generating a target bullet screen corresponding to the comment according to the comment text information when the comment is the predetermined comment type;

when a video is on a video playback interface, if an operation of triggering the target bullet screen is detected, controlling the video to jump to a target video interface corresponding to the target bullet screen.

The method and system of displaying a video, computing device, and readable storage medium provided in the present invention recognize text information of the comment input by the user, recognize the type of the comment, when the type of the comment is a predetermined comment type, a corresponding target bullet screen is generated, when the video is displayed, if an operation of triggering the target screen is detected, jump to a corresponding target video interface. Through the embodiments of the present invention, the video can be quickly jumped to a specified time point position according to user requirement, which greatly improves the user's video viewing experience.

It should be noted that in this article, the terms "include", "comprise" or any other variants thereof are intended to cover non-exclusive inclusion, so that a process, a method, an article or a device including a series of elements not only includes those elements, but also includes other elements that are not explicitly listed, or elements that are inherent to the process, the method, the article, or the device. In the absence of more restrictions, the element defined by the sentence "including a . . . " does not exclude the existence of other identical elements in the process, the method, the article or the device that includes the element.

The above-mentioned serial numbers of the embodiments of the present invention are merely for description, and do not represent the superiority or inferiority of the embodiments.

Through the description of the above embodiments, those skilled in the art can clearly understand that the methods in the above embodiments can be implemented by means of software plus a necessary general hardware platform, and of course, can also be implemented by hardware, but in many cases the former is a better implementation.

The embodiments described above are just preferred embodiments of the present invention and thus do not limit the patent scope of the present invention. Any equivalent structure, or equivalent process transformation made according to the contents of the description and the drawings of the present invention or any direct or indirect application to other related arts shall be also included in the patent protection scope of the present invention.

What is claimed is:

1. A method of displaying a video, comprising:
receiving comment text information from a user, the comment text information is associated with the video;
determining that the comment text information corresponds to a predetermined type of bullet screen based on parsing the comment text information, wherein the predetermined type of bullet screen has a particular format, wherein a bullet screen corresponds to a comment from any one user on the video and moves cross at least one frame of the video, wherein the predetermined type of bullet screen is a particular type of bullet screen with the particular format, wherein any one bullet screen belonging to the predetermined type of bullet screen comprises both content and a character string indicative of a time point, wherein positions of the content and the character string indicative of the time point in the any one of the predetermined type of bullet screen are arranged in the particular format, wherein the any one of the predetermined type of bullet screen comprises the content followed by the character string indicative of the time point or the character string indicative of the time point followed by the content, and wherein the determining that the comment text information corresponds to a predetermined type of bullet screen based on parsing the comment text information further comprising:
determining a text format of the comment text information based on parsing the comment text information, and
determining that the comment text information corresponds to the predetermined type of bullet screen based on a determination that the comment text information received from the user comprises at least one time point in a predetermined format;
displaying a target bullet screen, wherein the target bullet screen is generated based on the comment text information and the particular format of the predetermined type of bullet screen, wherein the target bullet screen comprises content and the at least one time point, and wherein positions of the content and the at least one time point in the target bullet screen are arranged in the particular format of the predetermined type of bullet screen;
in response to detecting a selection of the target bullet screen on a first interface for playback of the video, displaying at least one interface element each of which is selectable and corresponds to an operation associated with the target bullet screen; and
in response to detecting a selection of one of the at least one interface element, controlling the video to jump to a target interface for playback of the video.

2. The method of claim 1, wherein when the comment text information comprises a plurality of time points in the predetermined format, the method further comprises:
identifying a first time point based on an order of the plurality of the time points appearing in the comment text information, wherein the target bullet screen is generated based on the first time point.

3. The method of claim 1, wherein the target bullet screen comprises text content, at least one time point, and an identifier indicating that the target bullet screen belongs to the predetermined type of bullet screen.

4. The method of claim 1, further comprising:
jumping to the target interface for playback of the video based on a time point comprised in the target bullet screen.

5. The method of claim 1, further comprising:
determining a time range of displaying the target comment relative to frames of the video based on a starting time and a time length of displaying the target bullet screen;
determining a number of the predetermined type of bullet screens displayed at a same time as the target bullet screen based on the time range of displaying the target comment; and
in response to determining that the number of the predetermined type of bullet screens displayed at the same time as the target bullet screen exceeds a predetermined value, displaying the predetermined number of the predetermined type of bullet screens.

6. The method of claim 1, further comprising:
generating and displaying a selectable interface element on the target interface;
determining that a selection of the selectable interface element is detected within a predetermined period of time; and
controlling the video to return to the first interface for playback of the video in response to detecting the selection of the selectable interface element within the predetermined period of time.

7. The method of claim 6, further comprising:
cancelling a display of the selectable interface element when the selection of the selectable interface element is not detected within the predetermined period of time.

8. A system of displaying a video, comprising:
at least one processor; and
at least one memory communicatively coupled to the at least one processor and storing instructions that upon execution by the at least one processor cause the system to perform operations, the operations comprising:
receiving comment text information from a user, the comment text information is associated with the video;
determining that the comment text information corresponds to a predetermined type of bullet screen based on parsing the comment text information, wherein the predetermined type of bullet screen has a particular format, wherein a bullet screen corresponds to a comment from any one user on the video and moves cross at least one frame of the video, wherein the predetermined type of bullet screen is a particular type of bullet screen with the particular format, wherein any one bullet screen belonging to the predetermined type of bullet screen comprises both content and a character string indicative of a time point, wherein positions of the content and the character string indicative of the time point in the any one of the predetermined type of bullet screen are arranged in the particular format, wherein the any one of the predetermined type of bullet screen comprises the content followed by the character string indicative of the time point or the character string indicative of the time point followed by the content, and wherein the determining that the comment text information corresponds to a predetermined type of bullet screen based on parsing the comment text information further comprising:
    determining a text format of the comment text information based on parsing the comment text information, and
    determining that the comment text information corresponds to the predetermined type of bullet screen based on a determination that the comment text information received from the user comprises at least one time point in a predetermined format;
displaying a target bullet screen, wherein the target bullet screen is generated based on the comment text information and the particular format of the predetermined type of bullet screen, wherein the target bullet screen comprises content and the at least one time point, and wherein positions of the content and the at least one time point in the target bullet screen are arranged in the particular format of the predetermined type of bullet screen;
in response to detecting a selection of the target bullet screen on a first interface for playback of the video, displaying at least one interface element each of which is selectable and corresponds to an operation associated with the target bullet screen; and
in response to detecting a selection of one of the at least one interface element controlling the video to jump to a target interface for playback of the video.

9. The system of claim 8, wherein the target bullet screen comprises text content, at least one time point, and an identifier indicating that the target bullet screen belongs to the predetermined type of bullet screen.

10. The system of claim 8, the operations further comprising:

jumping to the target interface for playback of the video based on a time point comprised in the target bullet screen.

11. The system of claim 8, the operations further comprising:
determining a time range of displaying the target comment relative to frames of the video based on a starting time and a time length of displaying the target bullet screen;
determining a number of the predetermined type of bullet screens displayed at a same time as the target bullet screen based on the time range of displaying the target comment; and
in response to determining that the number of the predetermined type of bullet screens displayed at the same time as the target bullet screen exceeds a predetermined value, displaying the predetermined number of the predetermined type of bullet screens.

12. The system of claim 8, the operations further comprising:
generating and displaying a selectable interface element on the target interface;
determining that a selection of the selectable interface element is detected within a predetermined period of time; and
controlling the video to return to the first interface for playback of the video in response to detecting the selection of the selectable interface element within the predetermined period of time.

13. The system of claim 12, the operations further comprising:
cancelling a display of the selectable interface element when the selection of the selectable interface element is not detected within the predetermined period of time.

14. A non-transitory computer-readable storage medium, storing computer-readable instructions that upon execution by a processor cause the processor to implement operations comprising:
receiving comment text information from a user, the comment text information is associated with the video;
determining that the comment text information corresponds to a predetermined type of bullet screen based on parsing the comment text information, wherein the predetermined type of bullet screen has a particular format, wherein a bullet screen corresponds to a comment from any one user on the video and moves cross at least one frame of the video, wherein the predetermined type of bullet screen is a particular type of bullet screen with the particular format, wherein any one bullet screen belonging to the predetermined type of bullet screen comprises both content and a character string indicative of a time point, wherein positions of the content and the character string indicative of the time point in the any one of the predetermined type of bullet screen are arranged in the particular format, wherein the any one of the predetermined type of bullet screen comprises the content followed by the character string indicative of the time point or the character string indicative of the time point followed by the content, and wherein the determining that the comment text information corresponds to a predetermined type of bullet screen based on parsing the comment text information further comprising:
    determining a text format of the comment text information based on parsing the comment text information, and determining that the comment text information corresponds to the predetermined type of bullet screen based on a determination that the comment text information received from the user comprises at least one time point in a predetermined format;

displaying a target bullet screen, wherein the target bullet screen is generated based on the comment text information and the particular format of the predetermined type of bullet screen, wherein the target bullet screen comprises content and the at least one time point, and wherein positions of the content and the at least one time point in the target bullet screen are arranged in the particular format of the predetermined type of bullet screen;

in response to detecting a selection of the target bullet screen on a first interface for playback of the video, displaying at least one interface element each of which is selectable and corresponds to an operation associated with the target bullet screen; and in response to detecting a selection of one of the at least one interface element, controlling the video to jump to a target interface for playback of the video.

15. The non-transitory computer-readable storage medium of claim 14, wherein the target bullet screen comprises text content, at least one time point, and an identifier indicating that the target bullet screen belongs to the predetermined type of bullet screen.

16. The non-transitory computer-readable storage medium of claim 14, the operations further comprising:

determining a time range of displaying the target comment relative to frames of the video based on a starting time and a time length of displaying the target bullet screen;

determining a number of the predetermined type of bullet screens displayed at a same time as the target bullet screen based on the time range of displaying the target comment; and in response to determining that the number of the predetermined type of bullet screens displayed at the same time as the target bullet screen exceeds a predetermined value, displaying the predetermined number of the predetermined type of bullet screens.

17. The non-transitory computer-readable storage medium of claim 14, the operations further comprising:

generating and displaying a selectable interface element on the target interface;

determining that a selection of the selectable interface element is detected within a predetermined period of time; and controlling the video to return to the first interface for playback of the video in response to detecting the selection of the selectable interface element within the predetermined period of time.

* * * * *